United States Patent
Asai et al.

(10) Patent No.: US 7,338,029 B2
(45) Date of Patent: Mar. 4, 2008

(54) COMPACT SOLENOID

(75) Inventors: Naoya Asai, Nagoya (JP); Hiroyuki Sugiura, Nagoya (JP)

(73) Assignee: Takasago Electric, Inc., Nagoya-shi (JP)

( * ) Notice: Subject to any disclaimer, the term of this patent is extended or adjusted under 35 U.S.C. 154(b) by 0 days.

(21) Appl. No.: 11/455,669

(22) Filed: Jun. 20, 2006

(65) Prior Publication Data

US 2007/0001135 A1    Jan. 4, 2007

(30) Foreign Application Priority Data

Jun. 29, 2005    (JP) .............................. 2005-190191

(51) Int. Cl.
*F16K 31/02*    (2006.01)

(52) U.S. Cl. .................... 251/65; 251/129.15; 361/142

(58) Field of Classification Search .................. 251/65, 251/129.15; 335/229; 361/142
See application file for complete search history.

(56) References Cited

U.S. PATENT DOCUMENTS

| | | | | |
|---|---|---|---|---|
| 2,223,986 A | * | 12/1940 | Eaton | ..................... 251/129.19 |
| 2,370,752 A | * | 3/1945 | Ray | ........................... 335/245 |
| 2,599,856 A | * | 6/1952 | Mikolic et al. | ............. 335/279 |
| 3,157,747 A | * | 11/1964 | Alexander | .................... 335/152 |
| 4,087,773 A | * | 5/1978 | Jencks et al. | ............... 335/243 |
| 4,442,418 A | * | 4/1984 | Myers | ......................... 335/230 |
| 4,749,167 A | * | 6/1988 | Gottschall | ..................... 251/65 |
| 4,999,531 A | * | 3/1991 | Mavadia et al. | ............ 335/230 |
| 5,063,955 A | * | 11/1991 | Sakakibara | .................... 137/1 |
| 5,340,032 A | * | 8/1994 | Stegmaier et al. | ..... 251/129.18 |
| 5,586,747 A | * | 12/1996 | Bennardo et al. | ...... 251/129.18 |
| 5,992,461 A | * | 11/1999 | Gilmore et al. | ........ 251/129.21 |
| 6,047,673 A | * | 4/2000 | Lohse et al. | ........... 251/129.18 |
| 6,578,536 B1 | * | 6/2003 | Donohue et al. | ...... 251/129.01 |

FOREIGN PATENT DOCUMENTS

JP    2001-178104    6/2001

* cited by examiner

*Primary Examiner*—John Bastianelli
(74) *Attorney, Agent, or Firm*—Edwards Angell Palmer & Dodge LLP

(57) ABSTRACT

A compact solenoid including a coil and a frame located outside the coil for constituting a magnetic circuit. The frame includes four bars extending in parallel to the axial direction of the coil and located proximate to the outer circumferential face of the coil. Each of the bars has a generally triangular cross section. The four bars are disposed to have a mutual positional relationship corresponding to vertexes of a square.

6 Claims, 15 Drawing Sheets

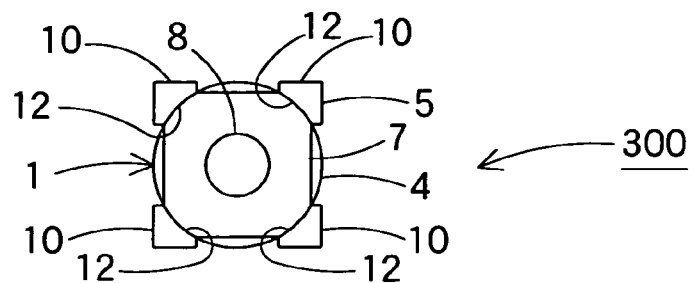
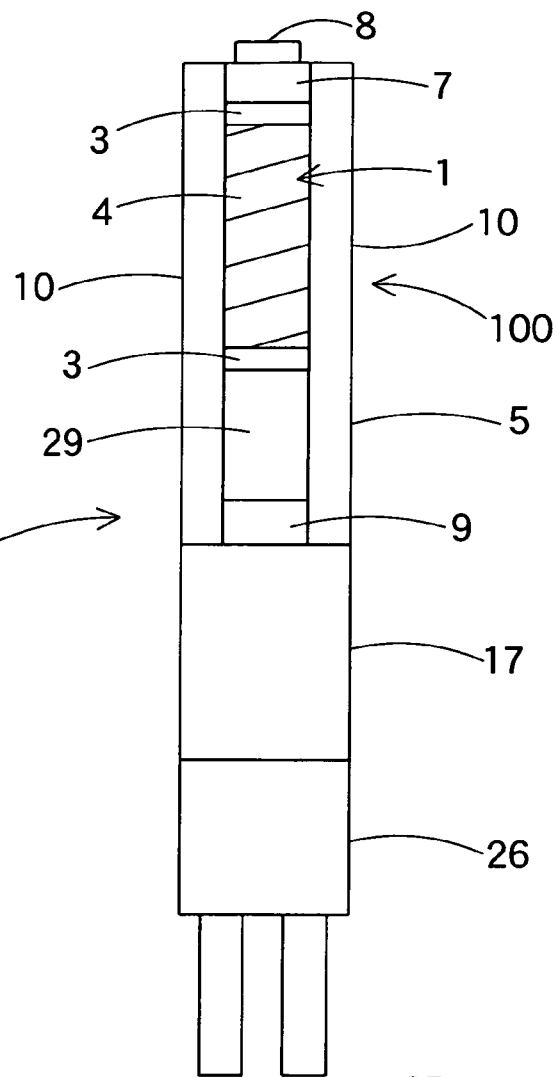
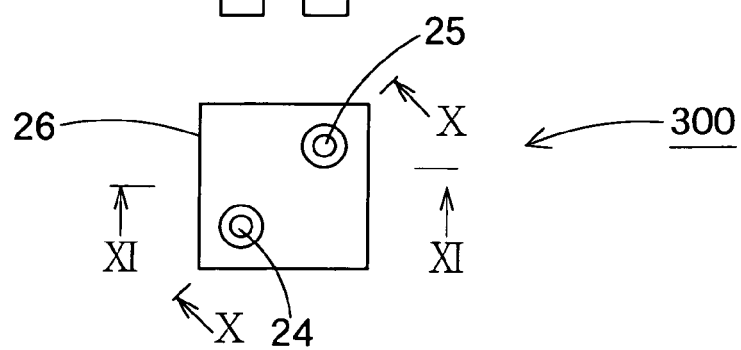

Fig.14A
PRIOR ART
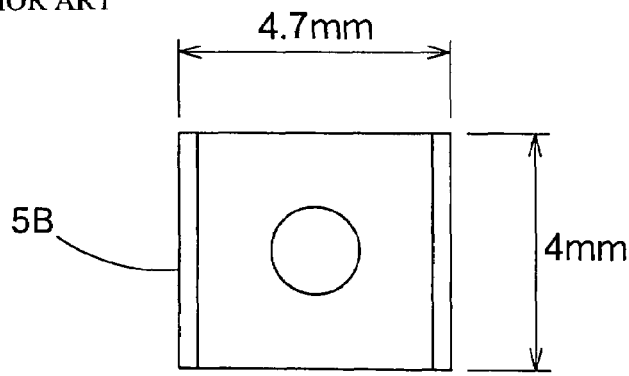
Fig.14B
PRIOR ART
Fig.14C
PRIOR ART
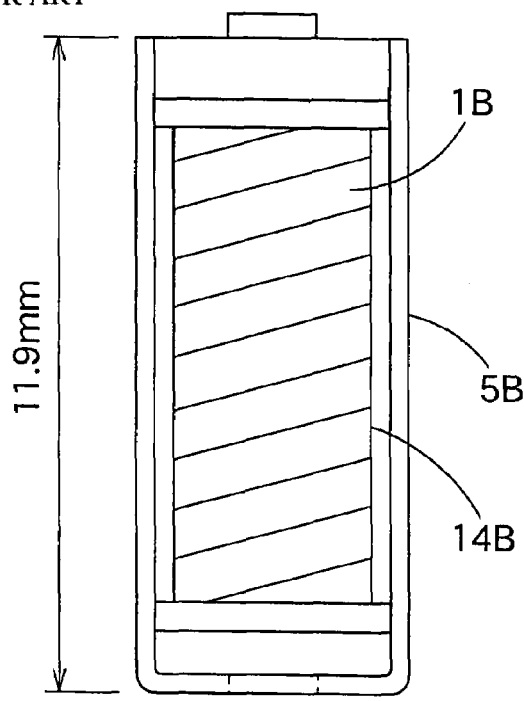
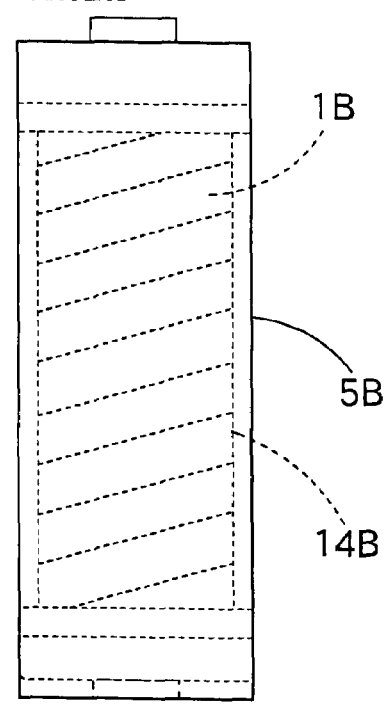
Fig.14D
PRIOR ART
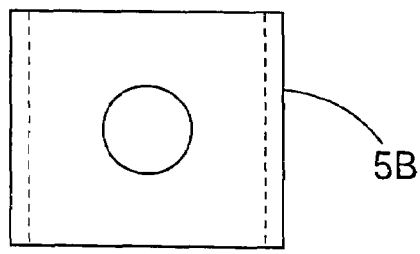

COMPACT SOLENOID

The present application claims priority from Japanese Patent Application No. 2005-190191 of Asai et al., filed on Jun. 29, 2005, the disclosure of which is hereby incorporated into the present application by reference.

BACKGROUND OF THE INVENTION

1. Field of the Invention

The present invention relates to a compact solenoid, a compact solenoid valve and, a compact latching solenoid valve.

2. Description of the Related Art

In such instruments as an apparatus for chemical examination, environmental analysis, or biotechnological research, it is an important issue to improve accuracy and to minimize a sample or reagent. This issue involves, in each system for mixture, reaction, and detection of fluid, a reduction of the length of fluid channel, a miniaturization of individual components, and a decrease of the entire internal volume of the system. Accordingly, it is also required to miniaturize a solenoid valve, which is broadly used in the fluid control section of the apparatus. Especially when more than one solenoid valves are arranged side by side, the miniaturization of each solenoid valve will directly conduce to a reduction of the length of fluid channel, and therefore, the miniaturization of the solenoid valve can be the most important issue.

Generally, a solenoid valve is comprised of a solenoid, a movable core reciprocably arranged inside the solenoid, a valve element arranged at the leading end of the movable core, and so on. The solenoid includes a coil and a frame located outside of the coil. The frame is fabricated of a magnetic material thereby constitutes a magnetic circuit.

The frame is categorized into two types; an open frame and a closed frame. The closed frame 5A illustrated in FIGS. 12A, 12B and 12C has a hollowed cylindrical shape, and covers all over the outer circumference 14A of the coil 1A. The open frame 5B illustrated in FIGS. 14A, 14B, 14C and 14D has a U-shaped vertical section. Assuming that the outer circumference 14B of the coil 1B has four sides, the frame 5B covers two of them. One example of the open frame is disclosed in JP 2001-178104 A.

If four compact solenoid valves employing a compact solenoid with a closed frame 5A are arranged side by side, as shown in FIG. 13, the footprint of the four compact solenoid valves is 81 mm$^2$, provided that the outer diameter of the coil 1A is 4 mm and the outer diameter of the frame 5A is 4.5 mm.

If four compact solenoid valves employing a compact solenoid with an open frame 5B are arranged side by side, as shown in FIG. 15, the footprint of the four compact solenoid valves is 75.2 mm$^2$, provided that the outer diameter of the coil 1B is 4 mm and the width of the frame 5B is 4.7 mm.

As has been described above, conventional compact solenoids have large footprints.

SUMMARY OF THE INVENTION

The object of the present invention is a further miniaturization of a compact solenoid, and thereby, a further miniaturization of a compact solenoid valve and a compact latching solenoid valve.

The compact solenoid according to the present invention includes a coil and a frame located outside of the coil for constituting a magnetic circuit. The frame includes a plurality of bars located proximate to the outer circumference of the coil in parallel to the axial direction of the coil. Each of the bars has a generally triangular cross section. The bars are disposed to have a mutual positional relationship corresponding to arbitrary vertexes of any polygon.

According to the compact solenoid of the present invention, the plural bars of the frame are so arranged to have a positional relationship corresponding to vertexes of a polygon, and the bars extend in parallel to the axial direction of the coil, in proximity to the outer circumference of the coil. Moreover, each of the bars has a generally triangular cross section. Accordingly, the width of the frame is substantially equal to the outer diameter of the coil, so that the compact solenoid is further miniaturized. Therefore, the footprint of the compact solenoids, when a plurality of them are laid out side by side, is reduced as compared with the footprint of conventional compact solenoids.

In this compact solenoid according to the present invention, it is desired that the polygon is a rectangle and, that four bars of the frame are disposed to have a mutual positional relationship corresponding to four vertexes of the rectangle. Of course, a rectangle includes a square.

With this arrangement, when the coil has a circular cross section, the four bars are located in positions corresponding to vertexes of a square. Then the length of each side of the square defined by the four bars, i.e. the width of the frame is set substantially equal to the outer diameter of the coil, so that the compact solenoid is further miniaturized. In addition, this arrangement simplifies the structure of the frame, and thereby facilitates the manufacturing of the compact solenoid.

When the coil has an oval cross section, the four bars are located in positions corresponding to vertexes of a rectangle, not of a square. Then the length of a longer side of the rectangle defined by the four bars, i.e. the width of a longer side of the frame is generally equal to the major axial length of the coil, whereas the length of a shorter side of the rectangle, i.e. the width of a shorter side of the frame is generally equal to the minor axial length of the coil, so that the compact solenoid is further miniaturized. In addition, this arrangement simplifies the structure of the frame, and thereby facilitates the manufacturing of the compact solenoid.

The compact solenoid valve according to the present invention includes a coil, a movable core reciprocably arranged inside the coil, a valve element located at the leading end of the movable core, and a frame located outside of the coil for constituting a magnetic circuit. The frame includes a plurality of bars extending in parallel to the moving direction of the movable core and located proximate to the outer circumference of the coil. Each of the bars has a generally triangular cross-section. The bars are disposed to have a mutual positional relationship corresponding to arbitrary vertexes of any polygon.

According to the compact solenoid valve of the present invention, the plural bars of the frame are so disposed to have a positional relationship corresponding to vertexes of a polygon, and the bars extend in parallel to the moving direction of the movable core, and in proximity to the outer circumference of the coil. Moreover, each of the bars has a generally triangular cross section. Accordingly, the width of the frame is substantially equal to the outer diameter of the coil, so that the compact solenoid valve is further miniaturized. Therefore, the footprint of the compact solenoid valves, when a plurality of them are laid out side by side, is reduced as compared with the footprint of conventional compact solenoid valves.

In this compact solenoid valve according to the present invention, it is desired that the polygon is a rectangle, and that four bars of the frame are disposed to have a mutual positional relationship corresponding to four vertexes of the rectangle. This arrangement enables further miniaturization of a compact solenoid valve. In addition, this arrangement simplifies the structure of the frame, and thereby facilitates the manufacturing of the compact solenoid valve.

The compact latching solenoid valve according to the present invention includes a coil, a movable core reciprocably arranged inside the coil, a permanent magnet located adjacent to the coil, a valve element located at the leading end of the movable core, and a frame located outside of the coil for constituting a magnetic circuit. The frame includes a plurality of bars extending in parallel to the moving direction of the movable core and located proximate to the outer circumference of the coil. Each of the bars has a generally triangular cross section. The bars are disposed to have a mutual positional relationship corresponding to arbitrary vertexes of any polygon.

According to the compact latching solenoid valve of the present invention, the plural bars of the frame are so disposed to have a mutual positional relationship corresponding to vertexes of a polygon, and the bars extend in parallel to the moving direction of the movable core, and in proximity to the outer circumference of the coil. Moreover, each of the bars has a generally triangular cross section. Accordingly, the width of the frame is substantially equal to the outer diameter of the coil, so that the compact latching solenoid valve is further miniaturized. Therefore, the footprint of the compact latching solenoid valves, when a plurality of them are laid out side by side, is reduced as compared with that of conventional compact latching solenoid valves.

In this compact latching solenoid valve according to the present invention, it is desired that the polygon is a rectangle, and that four bars of the frame are disposed to have a mutual positional relationship corresponding to four vertexes of the rectangle. This arrangement enables further miniaturization of a compact latching solenoid valve. In addition, this arrangement simplifies the structure of the frame, and thereby facilitates the manufacturing of the compact latching solenoid valve.

BRIEF DESCRIPTION OF DRAWINGS

FIG. 9A is a plan view of a compact latching solenoid valve embodying the present invention, FIG. 9B is a front view of the latching solenoid valve of FIG. 9A, FIG. 9C is a bottom view of the latching solenoid valve of FIG. 9A;

FIG. 14A is a plan view of a compact solenoid having a conventional open frame, FIG. 14B is a front view of the compact solenoid of FIG. 14A, FIG. 14C is a side view of compact solenoid of FIG. 14A, and FIG. 14D is a bottom view of the compact solenoid of FIG. 14A;

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Firstly, a compact solenoid 100 embodying the present invention is described.

Figure 7:
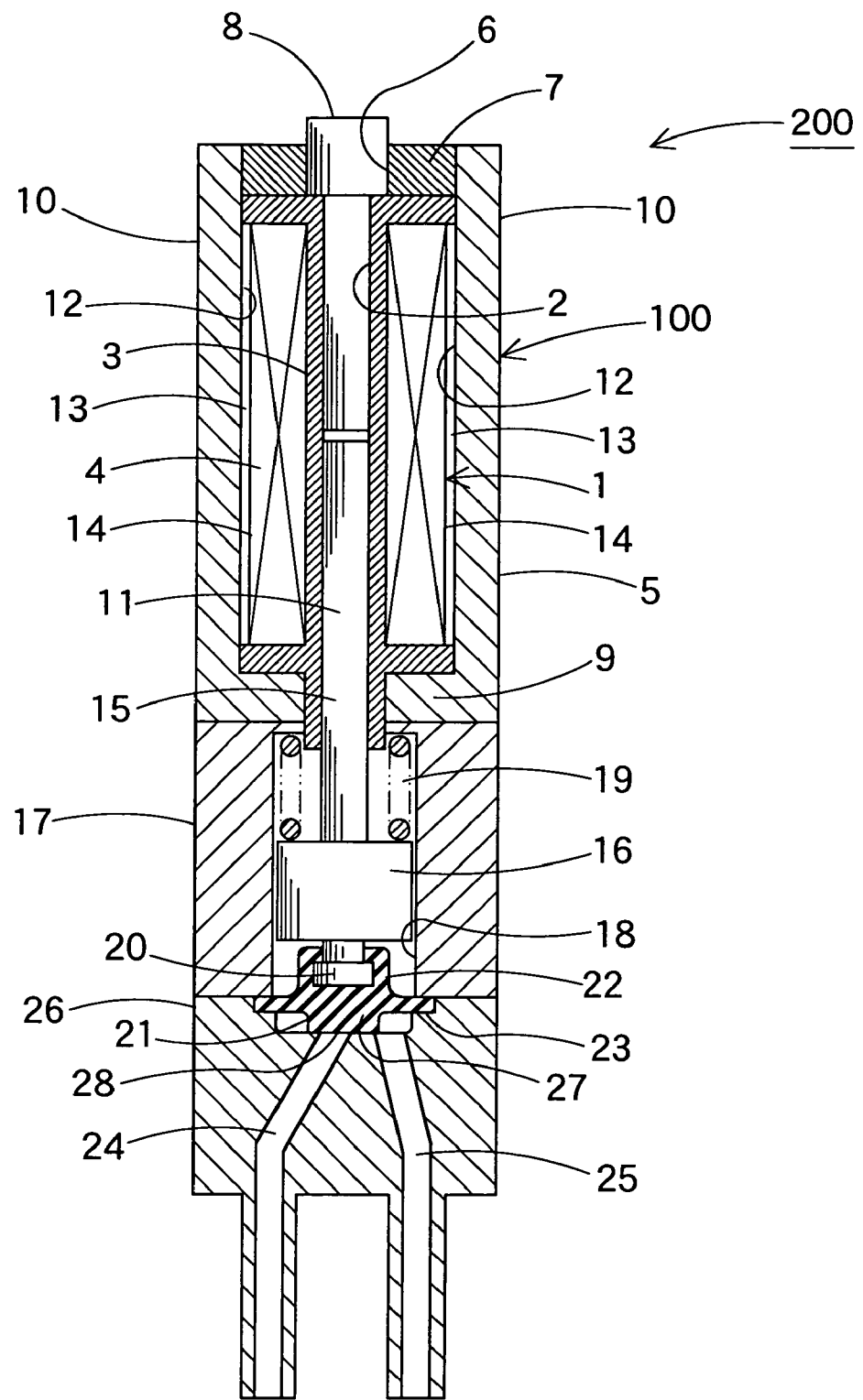
FIG. 7 is a sectional view of the compact solenoid valve of FIG. 6A, taken along the line VII-VII in FIG. 6C.
Figure 8:
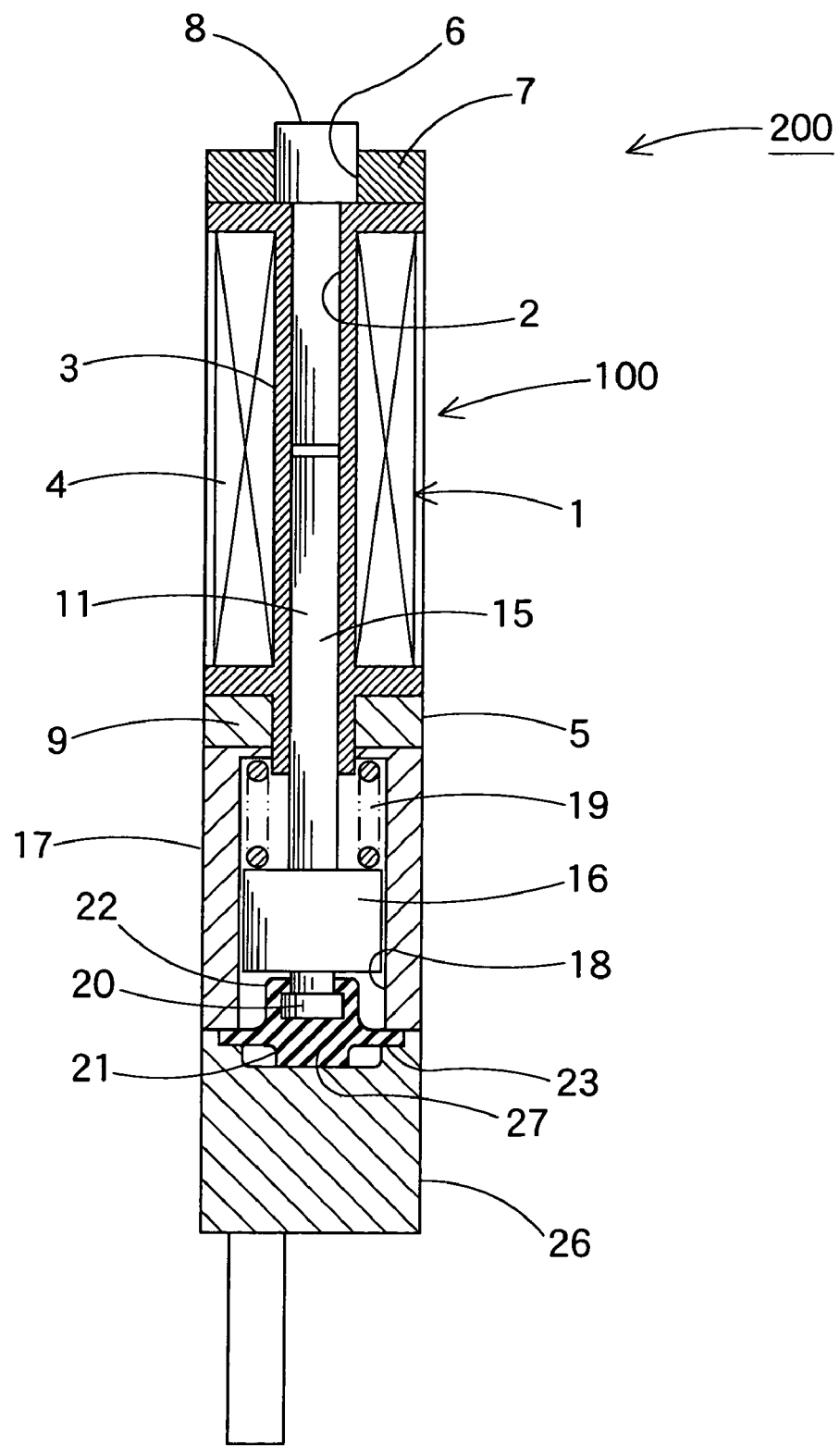
FIG. 8 is a sectional view of the compact solenoid valve of FIG. 6A, taken along the line VIII-VIII in FIG. 6C.
Figure 10:
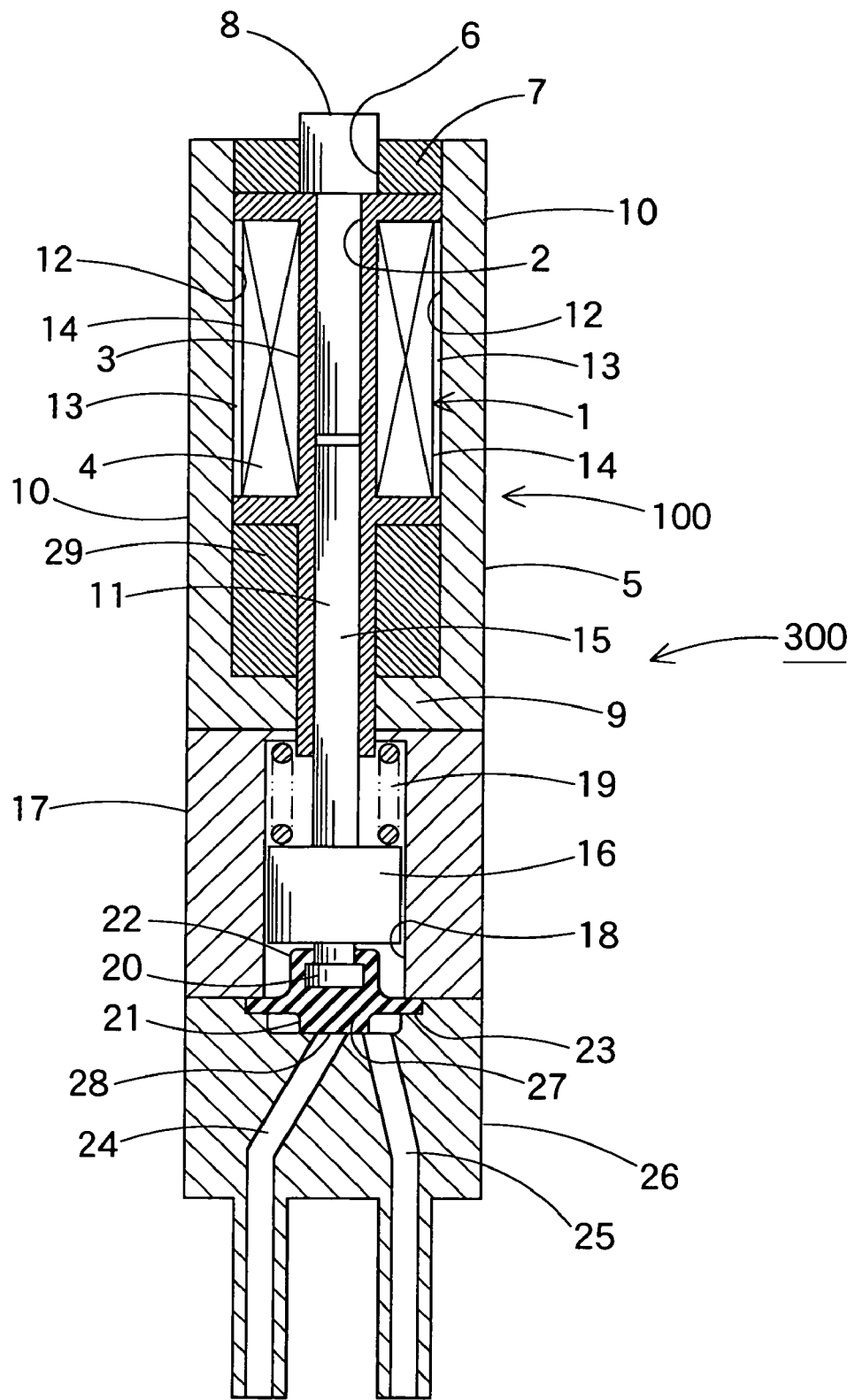
FIG. 10 is a sectional view of the compact latching solenoid valve of FIG. 9A, taken along the line X-X in FIG. 9C.
Figure 11:
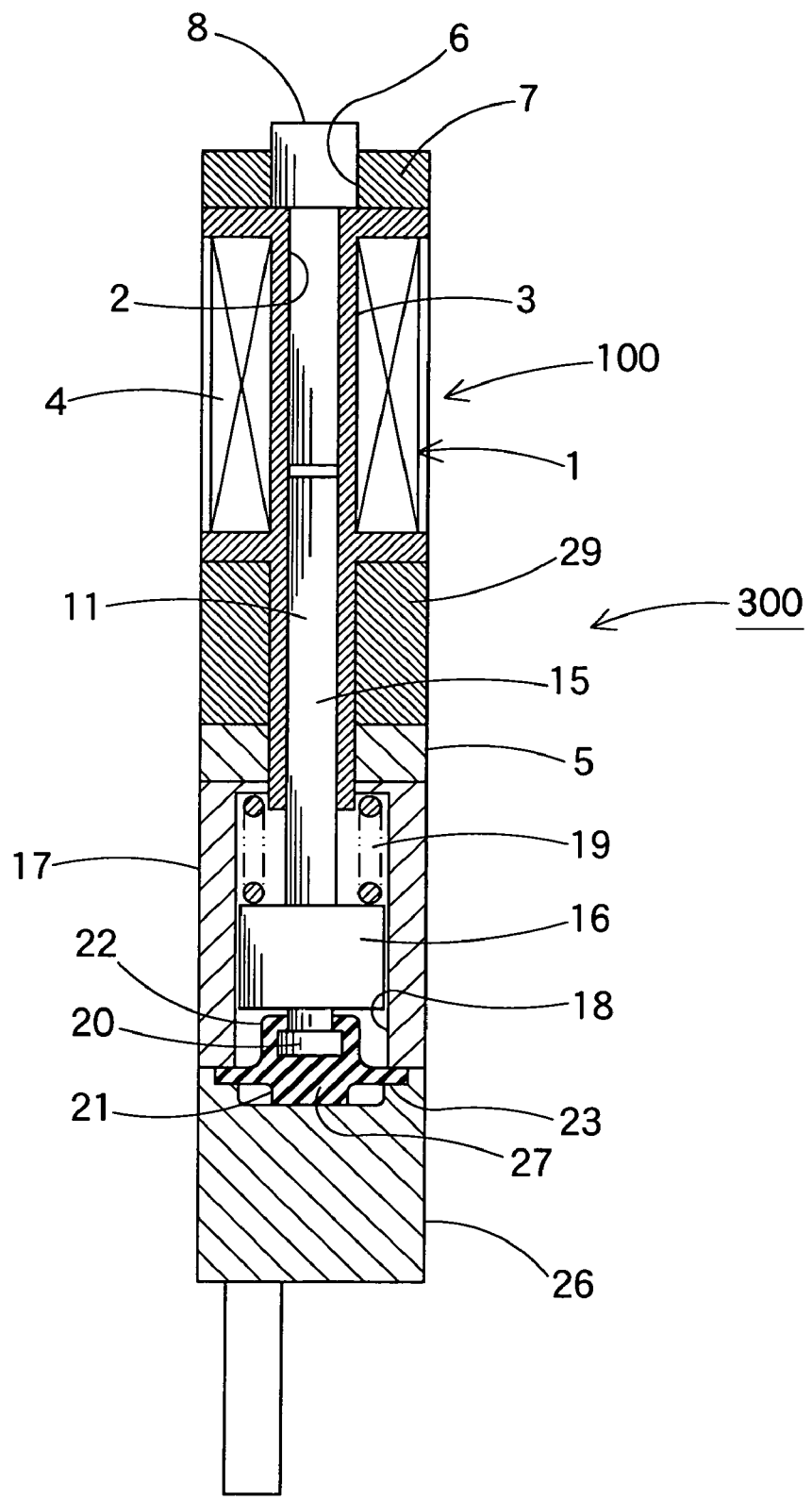
FIG. 11 is a sectional view of the compact latching solenoid valve of FIG. 9A, taken along the line XI-XI in FIG. 9C.
Figure 12A:
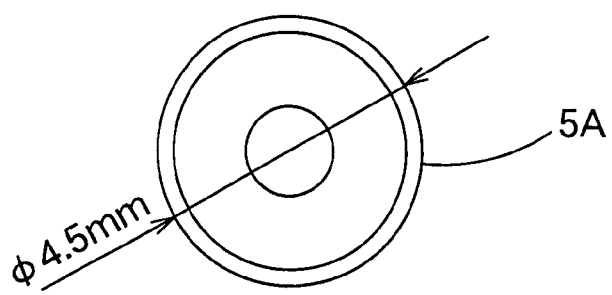
FIG. 12A is a plan view of a compact solenoid having a conventional closed frame.
Figure 12B:
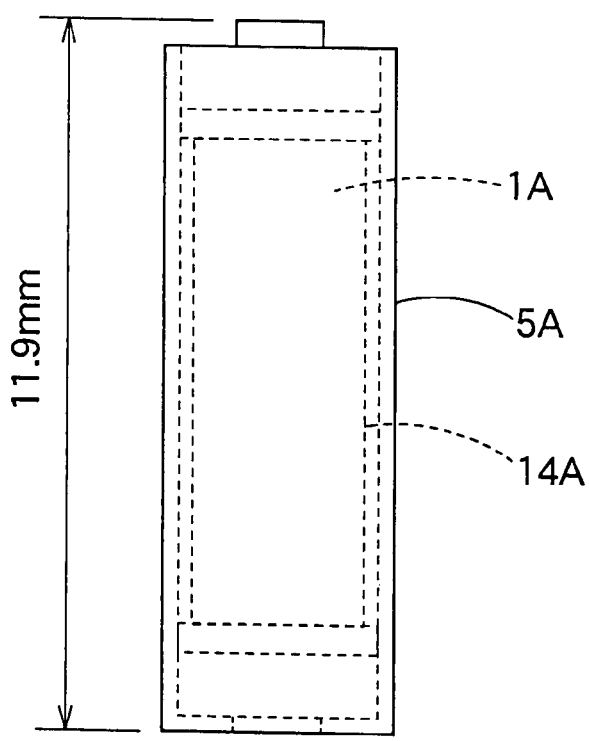
FIG. 12B is a front view of the compact solenoid of FIG. 12A.
Figure 12C:
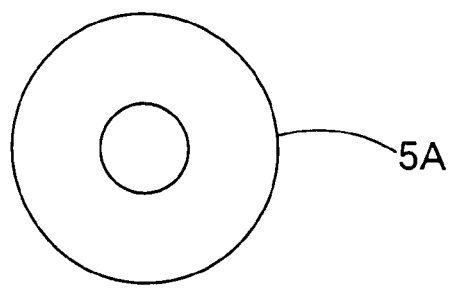
FIG. 12C is a bottom view of the compact solenoid of FIG. 12A.
Figure 13:
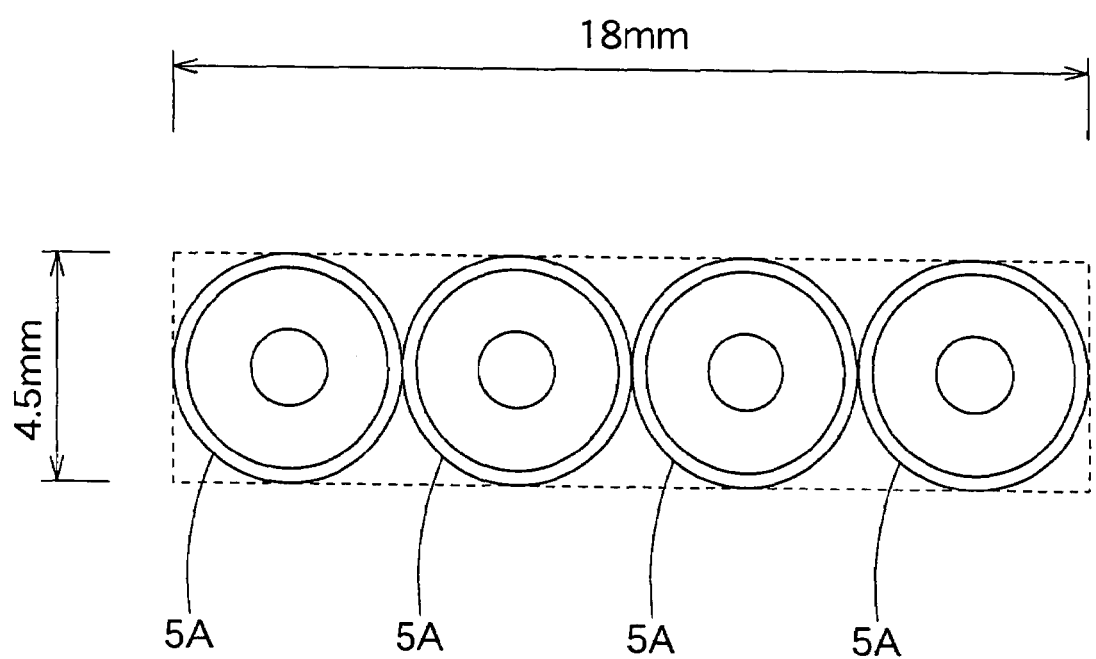
FIG. 13 illustrates a footprint of the compact solenoid shown in FIGS. 12A, 12B and 12C, as four of them are laid out side by side.
Figure 15:
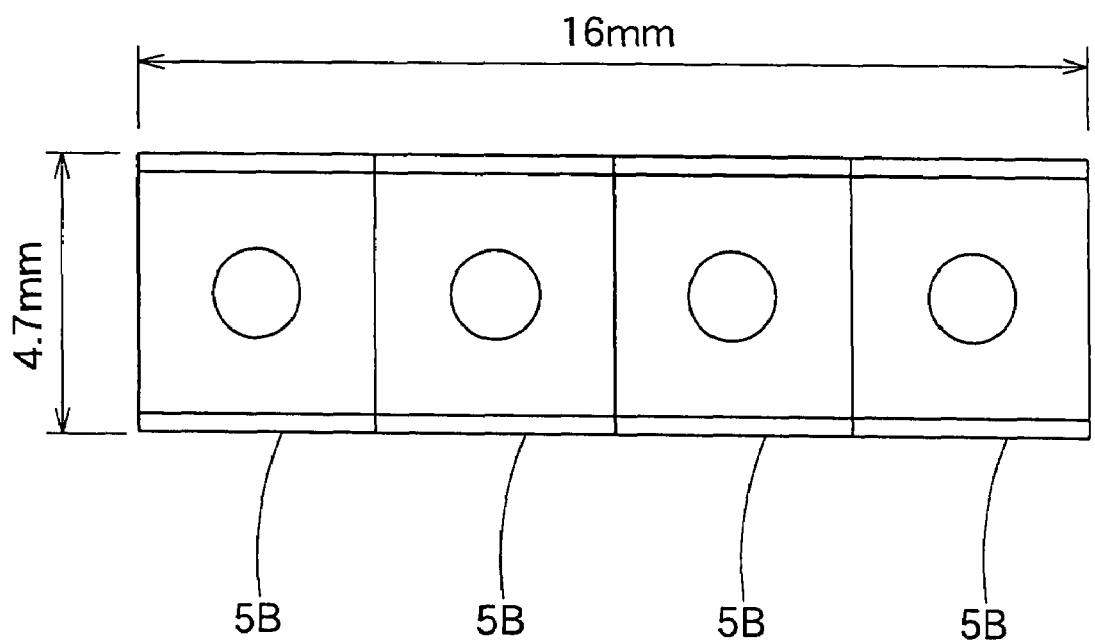
FIG. 15 illustrates a footprint of the compact solenoid shown in FIGS. 14A, 14B, 14C and 14D, as four of them are laid out side by side.

As shown in FIGS. 1A, 1B, 1C, 1D, 2, 3 and 4, the compact solenoid 100 includes a cylindrical hollow coil 1. As shown in FIGS. 7 and 8, the coil 1 is formed by winding a winding wire 4 around a bobbin 3 having an inner bore 2. Outside of the coil 1 is a frame 5 made from a magnetic material, which frame forms a magnetic circuit. The frame 5 can be paraphrased a housing 5. In an end face of the coil 1 is arranged a plate-like end cap 7 having a circular hole 6. A stationary core 8 is inserted through the hole 6 of the end cap 7 and into a part of the inner bore 2, and is fixed thereat.

Figure 1A:
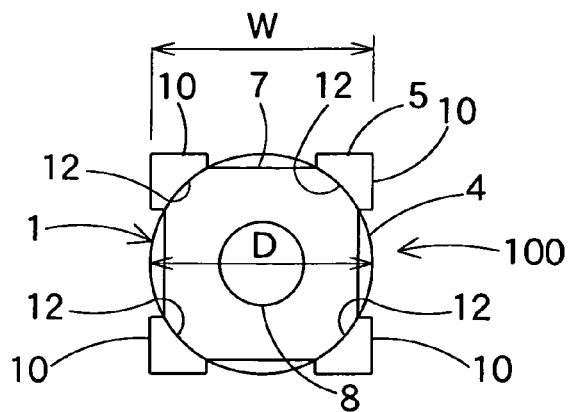
FIG. 1A is a plan view of a compact solenoid embodying the present invention.
Figure 1B:
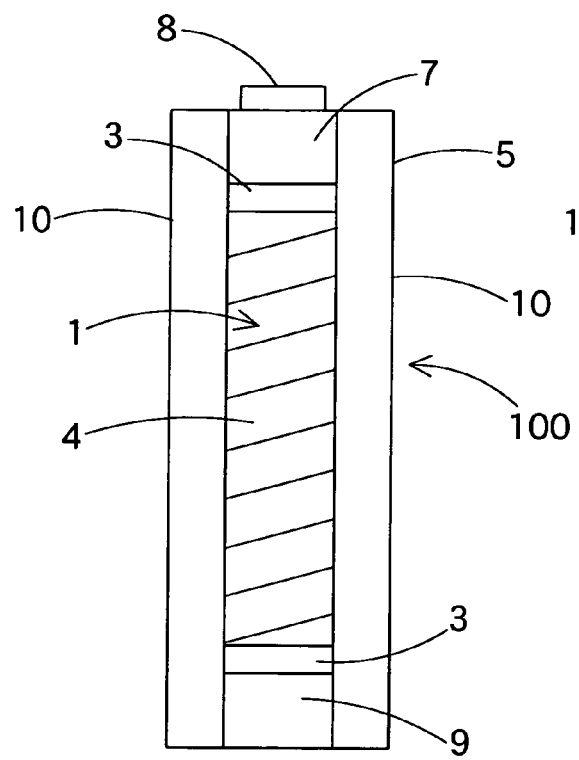
FIG. 1B is a front view of the compact solenoid of FIG. 1A.
Figure 1C:
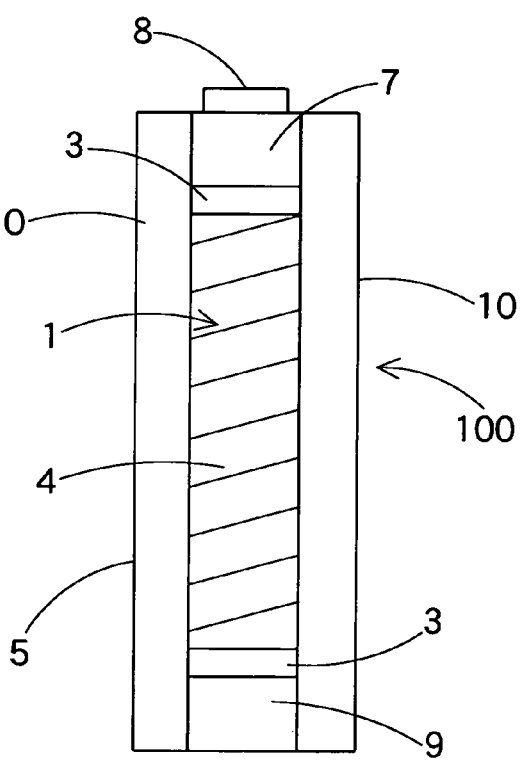
FIG. 1C is a side view of the compact solenoid of FIG. 1A.
Figure 1D:
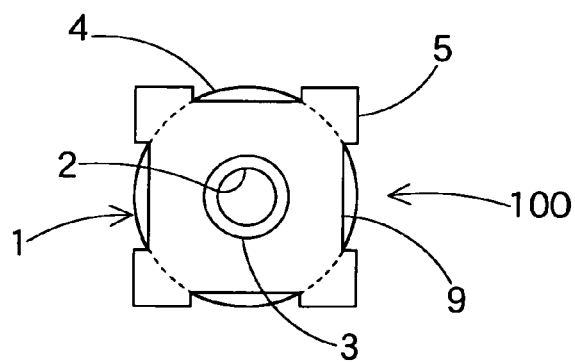
FIG. 1D is a bottom view of the compact solenoid of FIG. 1A.
Figure 2:
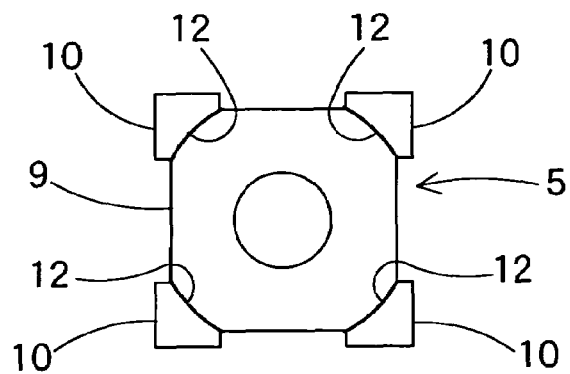
FIG. 2 is a plan view of a frame of the compact solenoid of FIG. 1A.
Figure 3:
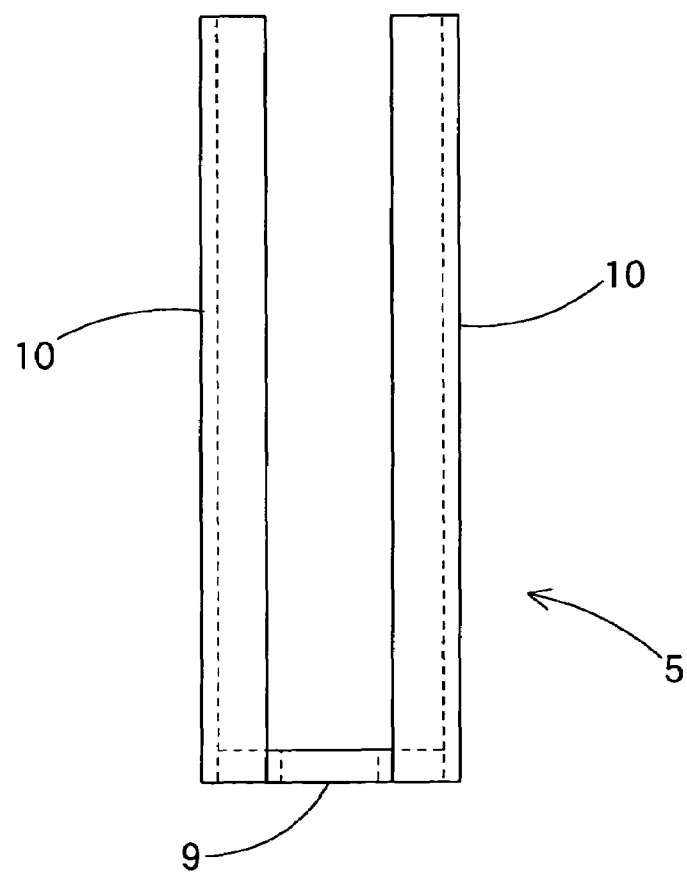
FIG. 3 is a front view of the frame of FIG. 2.
Figure 4:
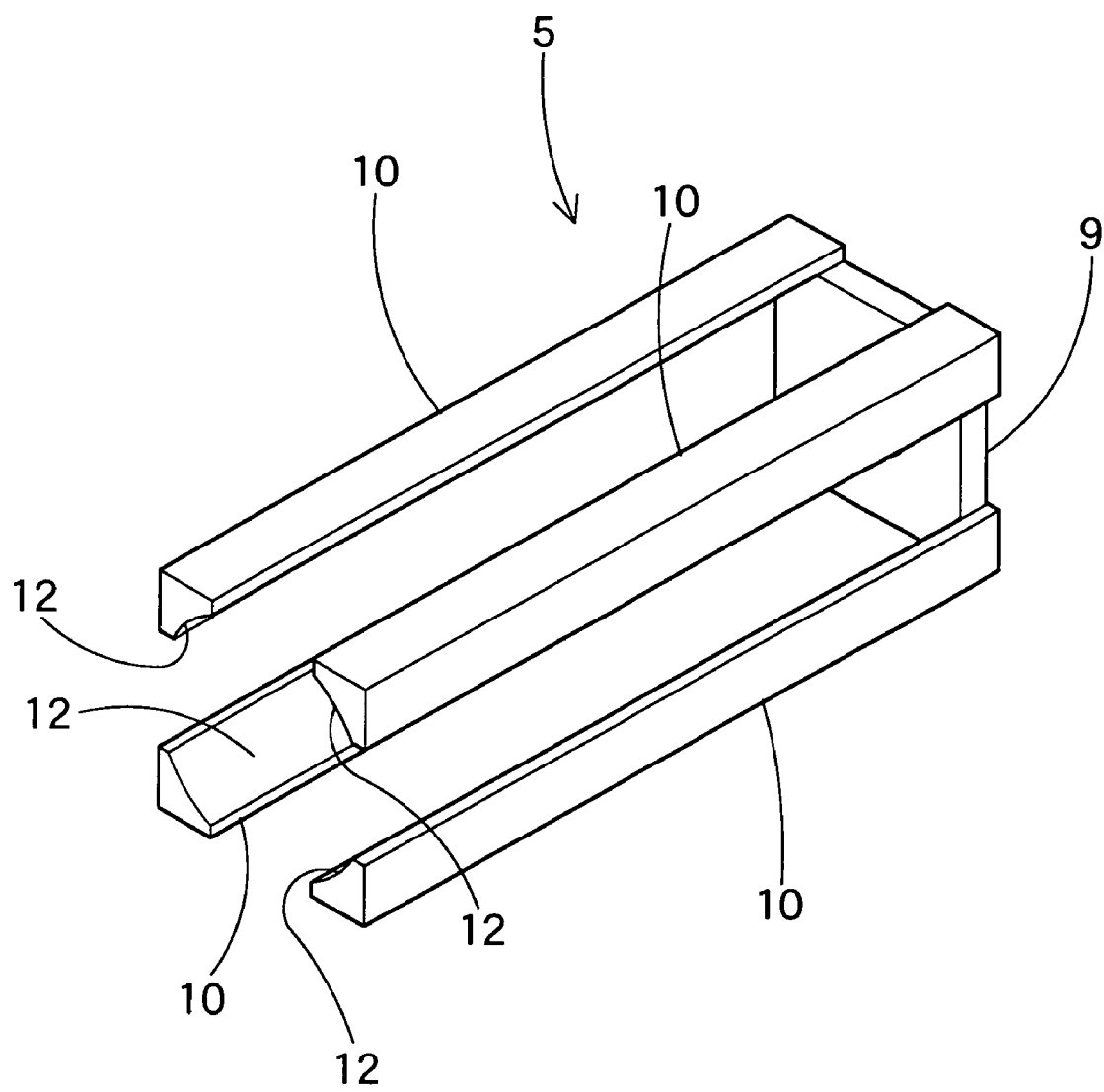
FIG. 4 is a perspective view of the frame of FIG. 2.

As shown in FIGS. 2, 3 and 4, the frame 5 includes a square base 9 and four bars 10 extending vertically from four corners of the base 9 in parallel to one another. In the center of the base 9 is a circular hole through which a movable core 11 (FIG. 7) is inserted. The bars 10 extend in parallel to the axial direction of the coil 1, and are disposed to have a mutual positional relationship corresponding to vertexes of a square. Each of the bars 10 has a generally triangular, or more specifically, a generally isosceles right triangular, cross section. As shown in FIG. 7, the inner surface 12 of each of the bars 10 confronts the outer circumferential face 14 of the coil 1, with a slight gap 13 therebetween. In other words, each of the bars 10 is located proximate to the outer circumferential face 14 of the coil 1. As shown in FIG. 1A, the width W of the frame 5 is set generally equal to the outer diameter D of the coil 1. The width W of the frame 5 is defined by the distance from the square corner of one of the adjacent bars 10 to the square corner of the other.

Figure 5:
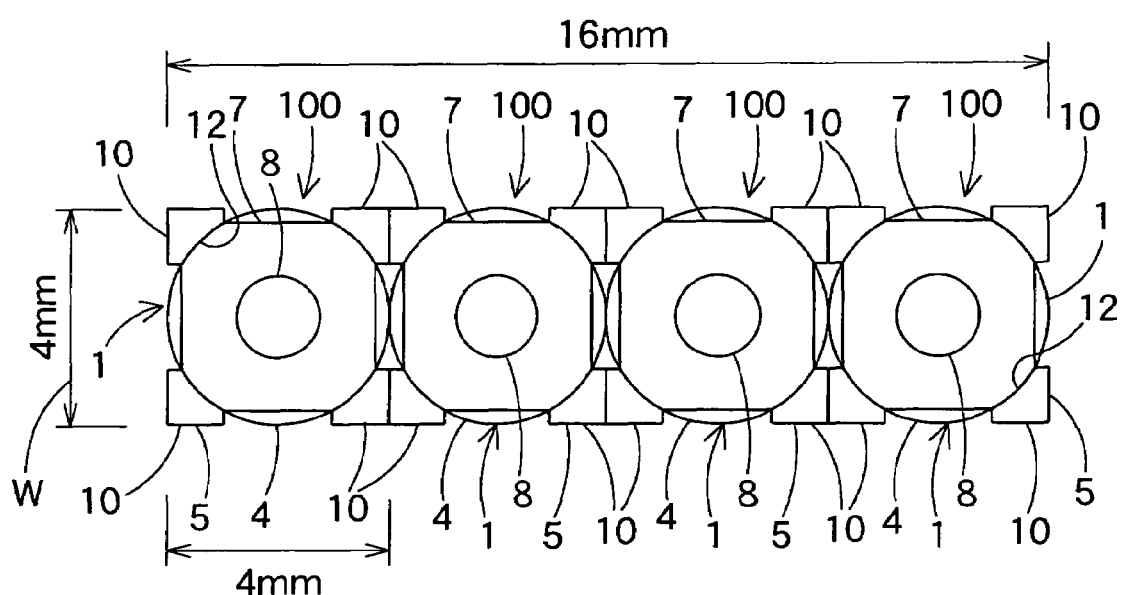
FIG. 5 illustrates a footprint of the compact solenoid of FIG. 1A, as four of them are laid out side by side.
Figure 6A:
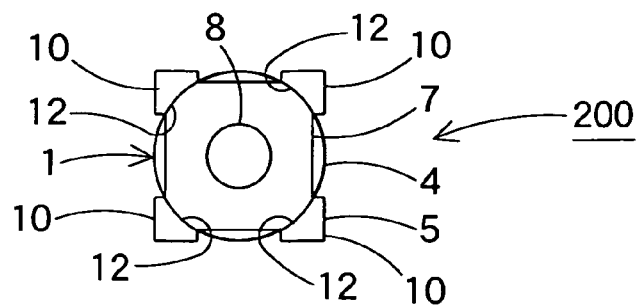
FIG. 6A is a plan view of a compact solenoid valve embodying the present invention.
Figure 6B:
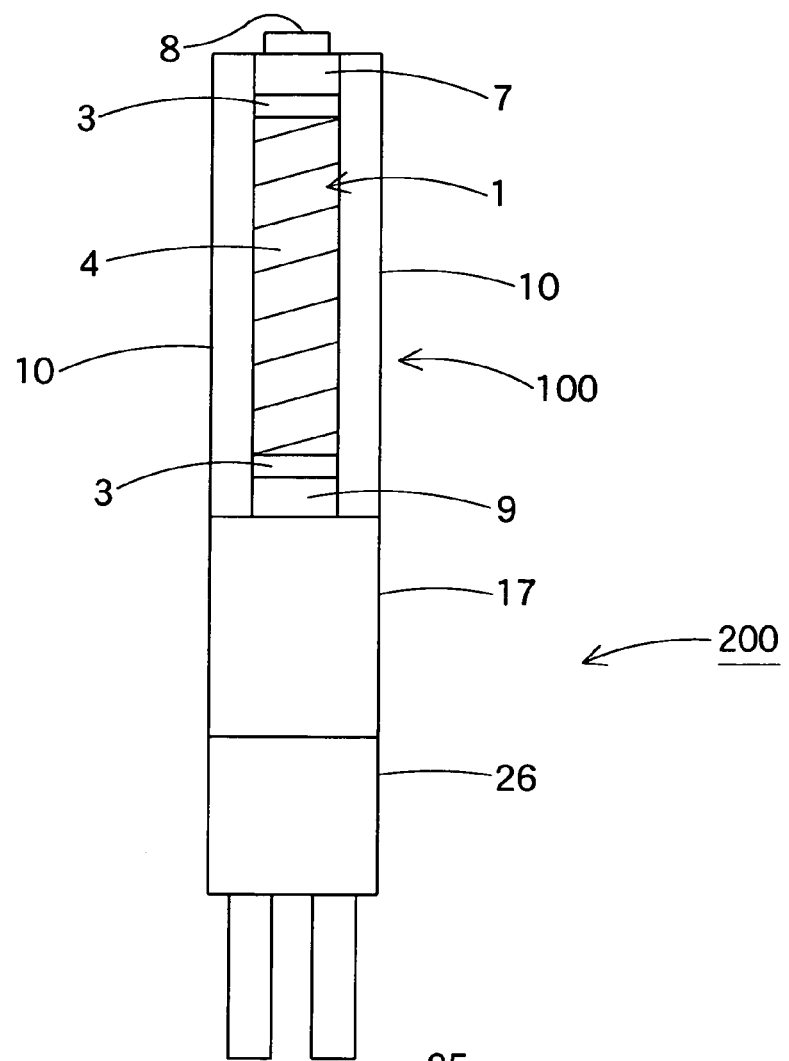
FIG. 6B is a front view of the solenoid valve of FIG. 6A.
Figure 6C:
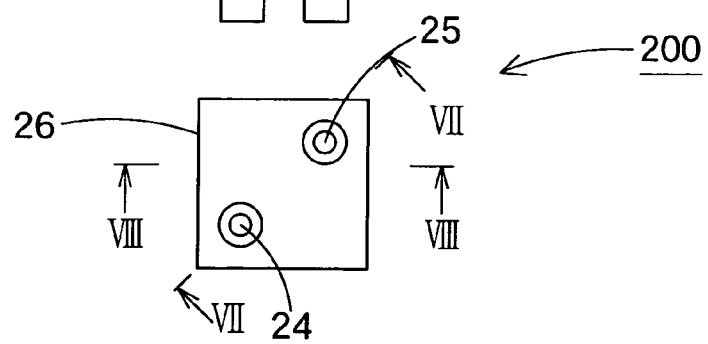
FIG. 6C is a bottom view of the solenoid valve of FIG. 6A.

As shown in FIG. 5, when four compact solenoids 100, whose width W of the frame 5 is 4 mm, are laid out side by side, the footprint of the solenoids is 64 mm². As is apparent from the comparison of the footprint 64 mm² with the footprint 81 mm² in the conventional compact solenoids with the closed frames 5A, or with the footprint 75.2 mm² in the conventional compact solenoids with the open frames 5B, the footprint is downsized by the compact solenoid 100 embodying the present invention.

As has been described above, the compact solenoid 100 of the foregoing embodiment includes the frame 5 provided with four bars 10. The four bars 10 are disposed to have such a mutual positional relationship as to correspond to vertexes of a square. Each of the bars 10 is arranged parallel to the axial direction of the coil 1 and, proximate to the outer circumferential face 14 of the coil 1. Each of the bars 10 has a generally triangular cross-section. With this arrangement, the length of each side of a square defined by the four bars 10, i.e. the width W of the frame 5 is substantially equal to the outer diameter D of the coil 1, so that the compact solenoid is further miniaturized. Therefore, the footprint of the compact solenoids 100 of the invention, when a plurality of them are laid out side by side, is reduced as compared with the footprint of conventional compact solenoids.

In the illustrated embodiment, the compact solenoid includes four bars 10 in the frame 5 which bars have a mutual positional relationship corresponding to vertexes of a square. However, it should be understood that a solenoid having two or three bars 10 is also contemplated as falling within the scope of the present invention. Moreover, it will also be appreciated to allocate a plurality of the bars 10 to have a mutual positional relationship corresponding to vertexes of any polygon other than a square, depending upon a sectional shape of the coil 1. In addition, the bars 10 do not necessarily need to be disposed at all the vertexes of the polygon, but the bars 10 may be disposed at arbitrary vertexes of the polygon.

Figure 16:
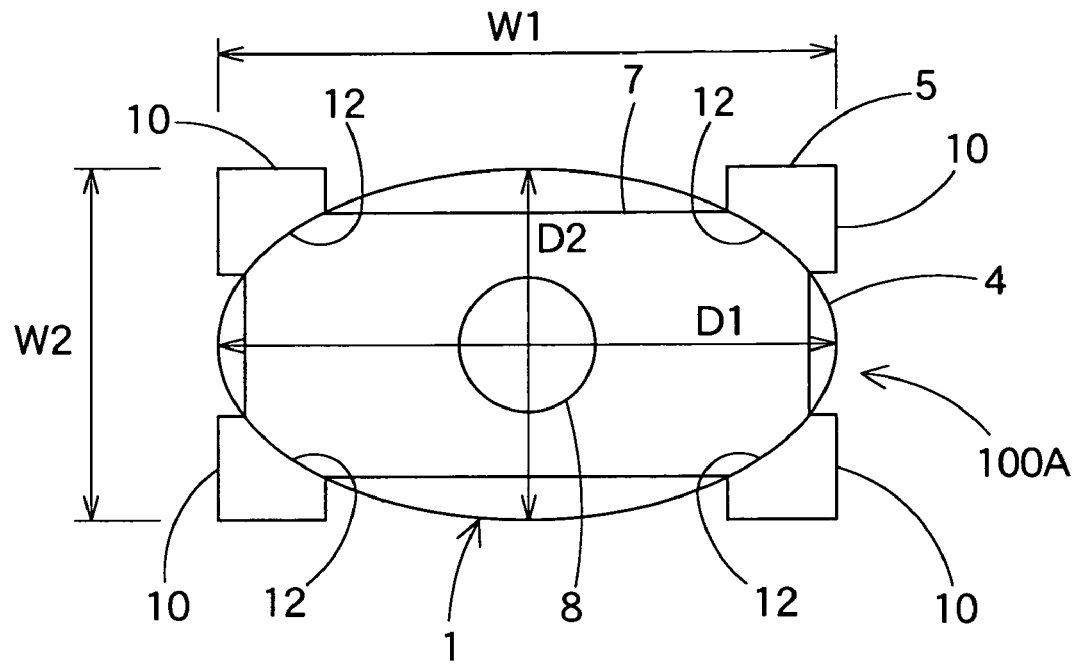
FIG. 16 is a plan view of a compact solenoid according to another embodiment of the present invention.

For example, as a compact solenoid 100A shown in FIG. 16, when a cross section of the coil 1 is oval, the bars 10 are located in positions corresponding to vertexes of a rectangle, not of a square. Here in FIG. 16, components of the compact solenoid 100A corresponding to those of the compact solenoid 100 are designated the same reference numerals as those of the compact solenoid 100. According to the compact solenoid 100A, the width W1 of the longer side of the frame 5 is generally equal to the major axial length D1 of the coil 1, whereas the width W2 of the shorter side of the frame 5 is generally equal to the minor axial length D2 of the coil 1, so that the compact solenoid is further miniaturized.

Figure 17:
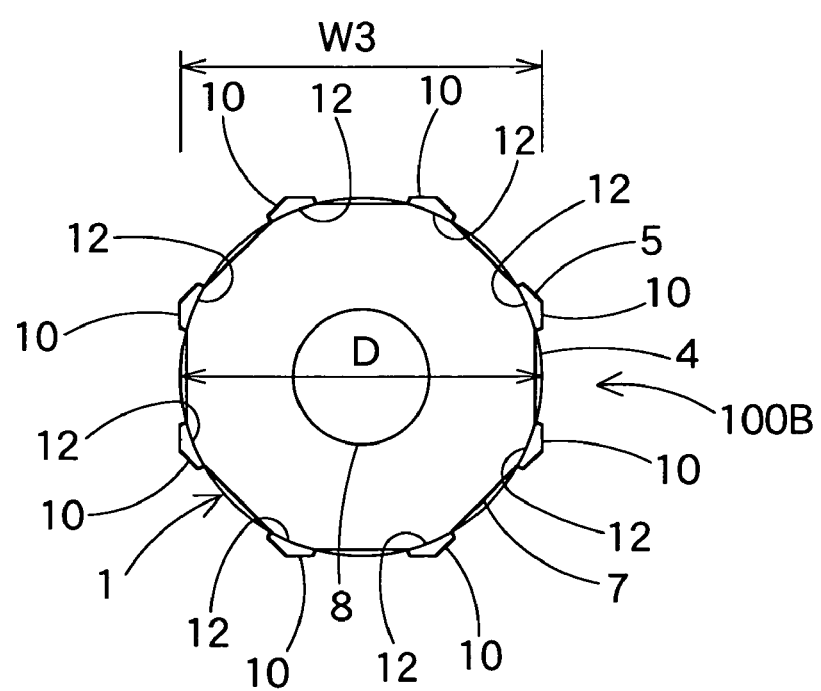
FIG. 17 is a plan view of a compact solenoid according to yet another embodiment of the present invention.

Further alternatively, as a compact solenoid 100B shown in FIG. 17, when a cross section of the coil 1 is circular, it will be appreciated that the solenoid 100B includes eight bars 10 located in positions corresponding to vertexes of an equilateral octagon. Here in FIG. 17, components of the compact solenoid 100B corresponding to those of the compact solenoid 100 are designated the same reference numerals as those of the compact solenoid 100. According to the compact solenoid 100B, the width W3 of the frame 5 is generally equal to the outer diameter D of the coil 1, so that the compact solenoid is further miniaturized.

If the cross section of the coil 1 is circular or oval, however, allocating the four bars 10 to have such a mutual positional relationship as to correspond to four vertexes of a rectangle will simplify the structure of the frame 5 and facilitates the manufacturing of the compact solenoid, as in the compact solenoid 100 or in the compact solenoid 100A.

An alternative embodiment of the present invention is shown in FIGS. 6A, 6B, 6C, 7 and 8, as a compact solenoid valve 200.

The compact solenoid valve 200 includes the above-described compact solenoid 100. The compact solenoid 100 includes, as its components, a coil 1, an inner bore 2, a bobbin 3, a winding 4, a frame 5, a circular hole 6, an end cap 7, a stationary core 8, a base 9, bars 10, inner surfaces of the bars 12, gaps 13 and, an outer circumferential face of the coil 14, as described above. The solenoid valve 200 further includes a movable core 11.

The movable core 11 includes a small diameter portion 15 and a large diameter portion 16 located at the leading end of the small diameter portion 15. The small diameter portion 15 is inserted into the inner bore 2 of the solenoid 100 in an axially reciprocable manner. The large diameter portion 16 is housed in a cavity 18 of a cylindrical first body 17 of the solenoid valve 200 in an axially reciprocable manner. The cavity 18 of the first body 17 also accommodates a coil spring 19 in a compressed manner. The coil spring 19 biases the movable core 11 away from the stationary core 8.

At the leading end of the large diameter portion 16 is a diaphragm holding portion 20 for holding a diaphragm 21 serving as valve element. More specifically, the diaphragm holding portion 20 holds a central region 22 of the diaphragm 21 on the part of the movable core. An outer circumferential region 23 of the diaphragm 21 is clamped between the first body 17 and a second body 26 of the solenoid valve 200 which second body 26 includes two fluid passages 24 and 25.

In the steady, unenergized state, the coil spring 19 exerts such a biasing force that a central region 27 of the diaphragm 21 on the part of the fluid passages closes an opening 28 of the fluid passage 24 out of the two fluid passages 24 and 25, so that the fluid passage 24 and the fluid passage 25 are kept in a cut-off state. In turn, when the coil 1 is energized, the magnetic force generated in the coil 1 acts such that the movable core 11 is attracted to the stationary core 8 in such a manner as to resist the biasing force of the coil spring 19, thereby the central region 27 on the part of the fluid passages is detached from the opening 28 and put the fluid passages 24 and 25 into a communicated state.

As has been described above, the compact solenoid valve 200 in the foregoing embodiment conduces to further miniaturization of a compact solenoid valve, since it employs the above-described compact solenoid 100. Therefore, the footprint of the compact solenoid valves 200, when a plurality of them are laid out side by side, will be reduced as compared with the footprint of conventional compact solenoid valves.

Another alternative embodiment of the present invention is shown in FIGS. 9A, 9B, 9C, 10 and 11, as a compact latching solenoid valve 300.

The compact latching solenoid valve 300 includes the above-described compact solenoid 100. The compact solenoid 100 includes, as its components, a coil 1, an inner bore 2, a bobbin 3, a winding wire 4, a frame 5, a circular hole 6, an end cap 7, a stationary core 8, a base 9, bars 10, inner surfaces of the bars 12, gaps 13, and an outer circumferential face of the coil 14, as described above. The compact latching solenoid valve 300 includes a movable core 11, as in the compact solenoid valve 200. In addition to these components, the compact solenoid 100 of the compact latching solenoid valve 300 includes a permanent magnet 29 located in a space provided between the base 9 of the frame 5 and the coil 1.

The movable core 11 includes a small diameter portion 15 and a large diameter portion 16 located at the leading end of the small diameter portion 15. The small diameter portion 15 is inserted into the inner bore 2 of the solenoid 100 in an axially reciprocable manner. The large diameter portion 16 is housed in a cavity 18 of a cylindrical first body 17 of the latching solenoid valve 300 in an axially reciprocable manner. The cavity 18 of the first body 17 also accommodates a coil spring 19 in a compressed manner. The coil spring 19 biases the movable core 11 away from the stationary core 8.

At the leading end of the large diameter portion 16 is a diaphragm holding portion 20 for holding a diaphragm 21 serving as valve element. More specifically, the diaphragm holding portion 20 holds a central region 22 of the diaphragm 21 on the part of the movable core. An outer circumferential region 23 of the diaphragm 21 is clamped between the first body 17 and a second body 26 of the latching solenoid valve 300 which second body 26 includes two fluid passages 24 and 25.

In the steady state, the coil spring 19 exerts such a biasing force that a central region 27 of the diaphragm 21 on the part of the fluid passages closes an opening 28 of the fluid passage 24 out of the two fluid passages 24 and 25, so that the fluid passage 24 and the fluid passage 25 are kept in a cut-off state.

In turn, when the coil 1 is energized and exerts such a magnetic force as not to cancel the magnetic force of the permanent magnet 29, the movable core 11 is attracted to the stationary core 8 in such a manner as to resist the biasing force of the coil spring 19, thereby the central region 27 on the part of the fluid passages is detached from the opening 28 and put the fluid passages 24 and 25 into a communicated state. Thereafter, even if the energization to the coil 1 is stopped, the magnetic force of the permanent magnet 29 holds the movable core 11 in the displaced position, so that the fluid passages 24 and 25 are kept in a communicated state.

In order to reinstate the fluid passages 24 and 25 in the cut-off state, a reverse electric current is passed through the coil 1 so that the coil 1 exerts such a magnetic force as to cancel the permanent magnet force. Then the magnetic force of the permanent magnet 29 is cancelled, so that the biasing force of the coil spring 19 returns the movable core 11 to the position in the steady state, then the central region 27 on the part of the fluid passages closes the opening 28 and, the fluid passages 24 and 25 are reinstated in the cut-off state.

As has been described above, the compact latching solenoid valve 300 in the foregoing embodiment conduces to further miniaturization of a compact latching solenoid valve, since it employs the above-described compact solenoid 100. Therefore, the footprint of the compact latching solenoid valves 300, when a plurality of them are laid out side by side, will be reduced as compared with the footprint of conventional compact latching solenoid valves.

1 . . . coil
2 . . . inner bore
3 . . . bobbin
4 . . . winding wire
5 . . . frame
6 . . . circular hole
7 . . . end cap
8 . . . stationary core
9 . . . base
10 . . . bar
12 . . . an inner surface of the bar
13 . . . gap 13
14 . . . outer circumferential face of the coil
15 . . . small diameter portion
16 . . . large diameter portion
17 . . . first body (of the solenoid valve)
18 . . . cavity
19 . . . coil spring
20 . . . diaphragm holding portion
21 . . . diaphragm
22 . . . central region of diaphragm on the part of the movable core
23 . . . outer circumferential region
24, 25 . . . fluid passage
26 . . . second body (of the solenoid valve)
27 . . . central region of diaphragm on the part of the fluid passages
28 . . . port

What is claimed is:

1. A compact solenoid comprising a coil and a frame located outside of the coil for constituting a magnetic circuit, wherein:
   the frame comprises a plurality of bars extending parallel to the axial direction of the coil and being located proximate to the outer circumferential face of the coil;
   each of the bars has a generally triangular cross section; and
   the bars are disposed to have a mutual positional relationship corresponding to arbitrary vertexes of any polygon such that a width of the frame is set substantially equal to an outer diameter of the coil.

2. The compact solenoid according to claim 1, wherein:
   the polygon is a rectangle; and
   the frame comprises four said bars disposed to have a mutual positional relationship corresponding to four vertexes of the rectangle.

3. A compact solenoid valve comprising a coil;
   a movable core reciprocably arranged inside the coil;
   a valve element located at the leading end of the movable core; and
   a frame located outside of the coil for constituting a magnetic circuit, wherein:
   the frame comprises a plurality of bars extending parallel to the moving directions of the movable core and being located proximate to the outer circumferential face of the coil;
   each of the bars has a generally triangular cross section; and
   the bars are disposed to have a mutual positional relationship corresponding to arbitrary vertexes of any polygon such that a width of the frame is set substantially equal to an outer diameter of the coil.

4. The compact solenoid valve according to claim 3, wherein:
   the polygon is a rectangle; and
   the frame comprises four said bars disposed to have a mutual positional relationship corresponding to four vertexes of the rectangle.

5. A compact latching solenoid valve comprising:
   a coil;
   a movable core reciprocably arranged inside the coil;
   a permanent magnet disposed adjacent to the coil;
   a valve element located at the leading end of the movable core; and
   a frame located outside of the coil for constituting a magnetic circuit, wherein:

the frame comprises a plurality of bars extending parallel to the moving direction of the movable core and being located proximate to the outer circumferential face of the coil;

each of the bars had generally triangular cross section; and the bars are disposed to have a mutual positional relationship corresponding to arbitrary vertexes of any polygon such that a width of the frame is set substantially equal to an outer diameter of the coil.

6. The compact latching solenoid valve according to claim 5, wherein:

the polygon is a rectangle; and the frame comprises four said bars disposed to have a mutual positional relationship corresponding to four vertexes of the rectangle.

\* \* \* \* \*